United States Patent
Li et al.

(10) Patent No.: US 10,564,510 B2
(45) Date of Patent: Feb. 18, 2020

(54) LIQUID CRYSTAL LENS AND MANUFACTURING METHOD THEREOF AND NAKED EYE THREE-DIMENSIONAL DISPLAY PANEL

(71) Applicant: BOE TECHNOLOGY GROUP CO., LTD., Beijing (CN)

(72) Inventors: Zhongxiao Li, Beijing (CN); Xiaochuan Chen, Beijing (CN); Wenqing Zhao, Beijing (CN); Qian Wang, Beijing (CN); Ming Yang, Beijing (CN); Xiaochen Niu, Beijing (CN); Haiyan Wang, Beijing (CN); Dacheng Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 72 days.

(21) Appl. No.: 15/768,625

(22) PCT Filed: Jul. 17, 2017

(86) PCT No.: PCT/CN2017/093134
§ 371 (c)(1),
(2) Date: Apr. 16, 2018

(87) PCT Pub. No.: WO2018/201614
PCT Pub. Date: Nov. 8, 2018

(65) Prior Publication Data
US 2019/0064630 A1  Feb. 28, 2019

(30) Foreign Application Priority Data

May 2, 2017  (CN) .......................... 2017 1 0301486

(51) Int. Cl.
*G02F 1/29* (2006.01)

(52) U.S. Cl.
CPC .......... *G02F 1/29* (2013.01); *G02F 2001/294* (2013.01)

(58) Field of Classification Search
CPC ............................ G02F 1/29; G02F 2001/294
(Continued)

(56) References Cited

U.S. PATENT DOCUMENTS

2014/0160380 A1* 6/2014 Song .................. G02B 27/2214
349/15
2014/0267959 A1 9/2014 Yang

FOREIGN PATENT DOCUMENTS

CN        102591088 A      7/2012
CN        102998729 A      3/2013
(Continued)

OTHER PUBLICATIONS

International Search Report dated Feb. 2, 2018, issued in counterpart application No. PCT/CN2017/093134. (13 pages).
(Continued)

*Primary Examiner* — Nathanael R Briggs
*Assistant Examiner* — William D Peterson
(74) *Attorney, Agent, or Firm* — Westerman, Hattori, Daniels & Adrian, LLP

(57) ABSTRACT

The present invention is related to a liquid crystal lens. The liquid crystal lens may comprise a plurality a liquid crystal lens units. At least one of the plurality of liquid crystal lens units may comprise a first substrate, a second substrate opposite the first substrate, a liquid crystal layer between the first substrate and the second substrate, and a scattering member on the first substrate at an edge of the liquid crystal lens unit. The scattering member may be configured to scatter crosstalk light at the edge of the liquid crystal lens unit.

20 Claims, 5 Drawing Sheets

(58) Field of Classification Search
USPC .......................................................... 349/112
See application file for complete search history.

(56) References Cited

FOREIGN PATENT DOCUMENTS

| CN | 103048841 A | | 4/2013 |
|----|-------------|---|--------|
| CN | 103235462 A | * | 8/2013 |
| CN | 103235462 A | | 8/2013 |
| CN | 103926748 A | | 7/2014 |
| CN | 103969911 A | | 8/2014 |
| CN | 204422876 U | | 6/2015 |
| CN | 106483667 A | | 3/2017 |
| JP | 2000249807 A | | 9/2000 |

OTHER PUBLICATIONS

Office Action dated Nov. 25, 2019, issued in CN Counterpart Application No. 201710301486.6, with English translation (12 pages).

* cited by examiner

LIQUID CRYSTAL LENS AND MANUFACTURING METHOD THEREOF AND NAKED EYE THREE-DIMENSIONAL DISPLAY PANEL

CROSS-REFERENCE TO RELATED APPLICATIONS

This application claims benefit of the filing date of Chinese Patent Application No. 201710301486.6 filed on May 2, 2017, the disclosure of which is hereby incorporated by reference.

TECHNICAL FIELD

This invention relates to a display technology, and more particularly, to a liquid crystal lens and a manufacturing method thereof, and a naked eye three-dimensional (3D) display panel including the same.

BACKGROUND

Naked eye three-dimensional (3D) display technology has been developed rapidly in recent years. Naked eye 3D products including mobile phones, televisions etc. are gradually entering people's life. Naked eye 3D technology can generally be divided into lens-type naked eye 3D technology and grating-type naked eye 3D technology. The lens-type naked eye 3D technology has advantages over the grating-type naked eye 3D technology. For example, in the grating-type naked eye 3D technology, half of pixels need to be blocked. As a result, transmittance and brightness are low. By contrast, in the lens-type naked eye 3D technology, no pixels need to be blocked. As a result, the overall transmittance and brightness are high.

The present lens-type naked eye 3D technology can be realized by two methods: using stamping technology to produce a fixed lens or a liquid crystal lens. With the latter, a focal length, deflection, and other technical parameters of the liquid crystal lens that affect 3D display effect can be effectively adjusted through driving signal of the liquid crystal lens, thereby adapting to different watching distances, numbers of audiences, and watching angles.

BRIEF SUMMARY

Accordingly one example of the present disclosure is a liquid crystal lens. The liquid crystal lens may comprise a plurality of liquid crystal lens units. At least one of the plurality of liquid crystal lens units may comprise a first substrate, a second substrate opposite the first substrate, a liquid crystal layer between the first substrate and the second substrate, and a scattering member on the first substrate at an edge of the at least one of the plurality of liquid crystal lens units. The scattering member may be configured to scatter crosstalk light at the edge of the at least one of the plurality of liquid crystal lens units.

At least one of the plurality of liquid crystal lens units may further comprise a first electrode on the first substrate. The scattering member may be between the first substrate and the first electrode. In another embodiment, the scattering member may be on a surface of the first electrode facing the second substrate.

At least one of the plurality of liquid crystal lens units may further comprise an alignment film on the first substrate. The alignment film may be on a surface of the first electrode facing the liquid crystal layer.

At least one of the plurality of liquid crystal lens units may further comprise a plurality of stripe-shaped second electrodes on the second substrate, wherein the scattering member is at a position corresponding to one of the stripe-shaped second electrodes. In one embodiment, the plurality of stripe-shaped second electrodes comprises n adjacent stripe-shaped second electrodes on the second substrate. The scattering member is provided on the first substrate at a position corresponding to the first electrode and n-th stripe-shaped second electrode respectively. n is a positive integer of greater than or equal to 2. A center of the scattering member may correspond to a center of one of the stripe-shaped second electrodes.

The scattering member may be adhered to the first substrate by an adhesive. In another embodiment, the scattering member may be adsorbed onto the first substrate. In another embodiment, the scattering member may be a scattering structure integrally on a surface of the first substrate. The scattering member may comprise scattering particles having particle sizes in a range of 10 nm to 100 μm. The scattering particles may be made of resin or silicon. The scattering particles may have spherical shape.

Another example of the present disclosure is a method of manufacturing a liquid crystal lens. The method of manufacturing a liquid crystal lens may comprise forming scattering members on a first substrate at edges of liquid crystal lens units and forming a liquid crystal cell by cell assembling the first substrate and a second substrate. In one embodiment, the scattering members may be formed on the first substrate by an adhesion method. In another embodiment, the scattering members may be formed on the first substrate by an adsorption method. The adsorption method may include electrostatic adsorption, comprising the following steps: applying an electrical signal on one of stripe-shaped second electrodes and forming the scattering members on the first substrate by electrostatic absorption.

Another example of the present disclosure is a naked eye 3D display panel. The naked eye 3D display panel may comprise a 2D display panel and a liquid crystal lens according to one embodiment of the present disclosure. The liquid crystal lens may be on a light exiting side of the 2D display panel, and scattering members may be at edges of adjacent liquid crystal lens units.

Another example of the present disclosure is a display device comprising the naked eye 3D display panel according to one embodiment of the present disclosure.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

Figure 1:
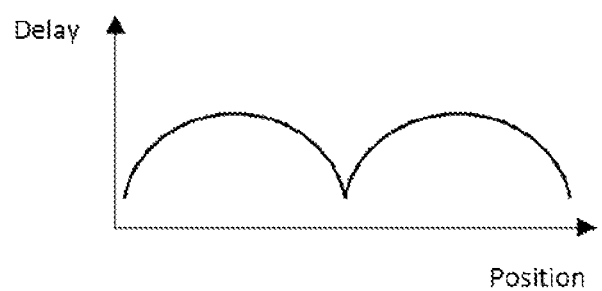
FIG. 1 is an ideal delay curve of the present liquid crystal lens-type naked eye 3D display structure.
Figure 2:
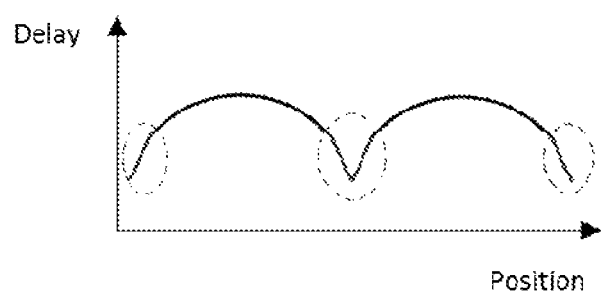
FIG. 2 is an actual delay curve of the present liquid crystal lens-type naked eye 3D display structure.

The present invention will be described in further detail with reference to the accompanying drawings and embodiments in order to provide a better understanding of the technical solutions of the present invention by those skilled in the art. Throughout the description of the invention, reference is made to FIGS. 1-12. When referring to the figures, like strictures and elements shown throughout are indicated with like reference numerals.

The following terms, used in the present description and the appended claims, have the following definition.

The term "edge of the liquid crystal lens unit" refers to a region near the boundary of the liquid crystal lens unit.

The inventors have found that there is at least the following problem in relevant prior arts: crosstalk value is generally high for a liquid crystal lens-type naked eye 3D display. Without being held to a particular theory, it is believed that, in liquid crystal lens array, poor appearance occurs at junctions of lenses. As a result, light cannot be deflected in a predetermined direction, thereby increasing crosstalk value. FIG. 1 shows a delay curve of the present liquid crystal lens-type naked eye 3D display structure. The delay curve in FIG. 1 is a delay curve in an ideal state. The curve is continuous and smooth, and there is no distortion at lens junctions, thereby meeting demand of a naked eye 3D display. However, in actual simulation and production process, distortion of the delay curve is produced at lens junctions, as shown in dotted circles in FIG. 2. The distortion is usually displayed as a straight line or other shapes. Light through this distorted region cannot be deflected in accordance with the ideal state, thereby causing crosstalk of 3D display.

Example 1

Figure 3:
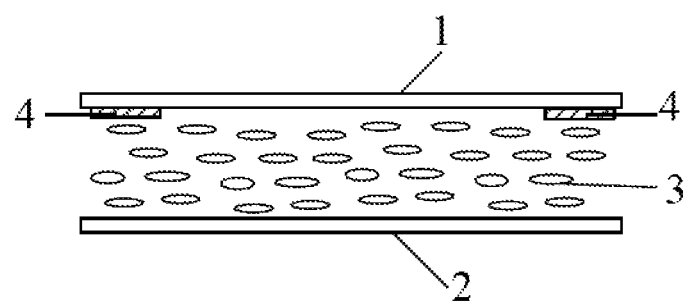
FIG. 3 is a schematic view of a liquid crystal lens unit according to one embodiment of the present disclosure.

FIG. 3 shows a schematic view of a liquid crystal lens unit according to one embodiment of the present disclosure. The liquid crystal lens unit includes a first substrate 1 and a second substrate 2 opposite the first substrate. The first substrate 1 is closer to a light exiting side than the second substrate 2. A liquid crystal layer 3 is provided between the first substrate 1 and the second substrate 2. Scattering members 4 are provided on the first substrate 1 at edges of the liquid crystal lens unit. The scattering members 4 are used for scattering crosstalk light at the edges of the liquid crystal lens unit.

Figure 12A:
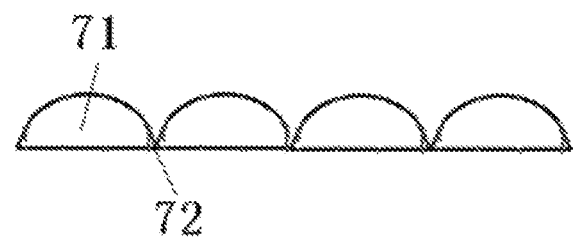
FIGS. 12(a) and (b) are schematic views of a liquid crystal lens array according to one embodiment of the present disclosure.
Figure 12B:
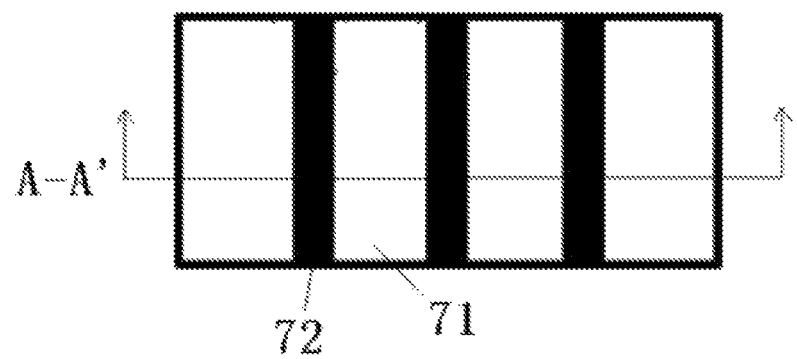

FIGS. 12(a) and (b) show schematic views of an array of multiple liquid crystal lens units according to one embodiment of the present disclosure. The edge 72 of the liquid crystal lens unit is shown in a cross-sectional view taken along line A-A' in FIG. 12(b). As shown in FIG. 12(a), there are four liquid crystal lens units 71. The edge 72 of the liquid crystal lens unit 71 is located between two adjacent liquid crystal lens units 71.

As shown in FIG. 3, a liquid crystal layer 3 is provided between the first substrate 1 and the second substrate 2 opposite the first substrate 1. The scattering member 4 is provided on a side of the first substrate 1 closer to the second substrate 2 and at the edge of the liquid crystal lens unit. As such, when the liquid crystal lens unit is used in a naked eye 3D display, the scattering member 4 can scatter crosstalk light, thereby reducing influence of liquid crystal lens distortion on crosstalk value of the 3D display.

Example 2

Figure 4:
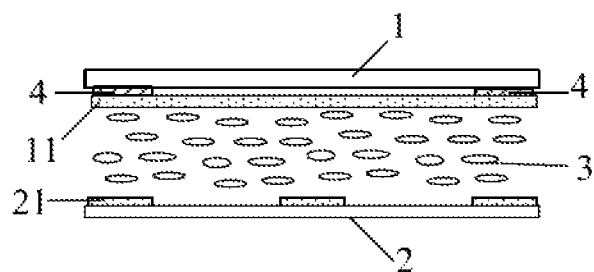
FIG. 4 is a schematic view of a liquid crystal lens unit according to one embodiment of the present disclosure.

FIG. 4 shows a schematic view of a liquid crystal lens unit according to one embodiment of the present disclosure. This embodiment provides a liquid crystal lens unit which includes a first substrate 1 and a second substrate 2 opposite the first substrate 1. A liquid crystal layer 3 is provided between the first substrate 1 and the second substrate 2. An alignment direction of liquid crystal molecules in the liquid crystal layer 3 is parallel to a polarization direction of an incident light. An electric field is at a vertical direction to the liquid crystal lens unit. For example, when an incident light is a horizontally polarized light, the liquid crystal molecules are horizontally oriented. Scattering members 4 are provided on the first substrate 1 at edges of the liquid crystal lens unit. The scattering members 4 are used for scattering crosstalk light at the edges of the liquid crystal lens unit. A first electrode 11 is further provided on the first substrate 1. The scattering members 4 may be provided on a side of the first electrode 11 closer to or farther away from the second substrate 2.

In one embodiment, a first electrode 11 and a second electrode 21 are provided between the first substrate 1 and the second substrate 2. The first electrode 11 and the second electrode 21 may be provided on the same substrate or on the first substrate 1 and the second substrate 2 respectively. An electrical voltage may be applied on the first electrode 11 and the second electrode 21 respectively to drive the liquid crystal molecules to form a lens. In one embodiment, the first substrate 1 is a color film substrate, and the second substrate 2 is an array substrate.

In one embodiment, as shown in FIG. 4, scattering members 4 are provided between a first substrate 1 and a first electrode 11, that is, on a side of the first electrode 11 farther away from the second substrate 2.

Figure 5:
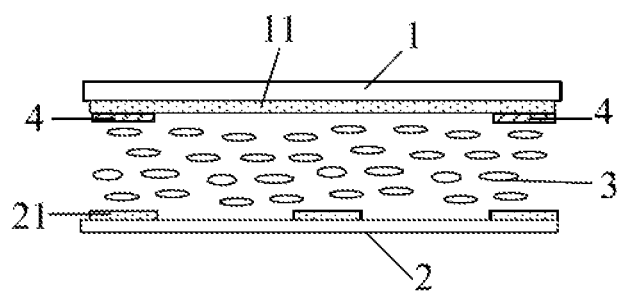
FIG. 5 is a schematic view of a liquid crystal lens unit according to one embodiment of the present disclosure.

FIG. 5 shows a schematic view of a liquid crystal lens unit according to one embodiment of the present disclosure. As shown in FIG. 5, scattering members 4 are provided below the first electrode 11, that is, on a side of the first electrode 11 closer to the second substrate 2. It can be understood that when scattering members 4 are disposed at edges of liquid crystal lens units, crosstalk light can be scattered. As a result, influence of liquid crystal lens distortion on crosstalk of 3D display is significantly reduced. Meanwhile, moiré pattern is not increased.

Figure 6:
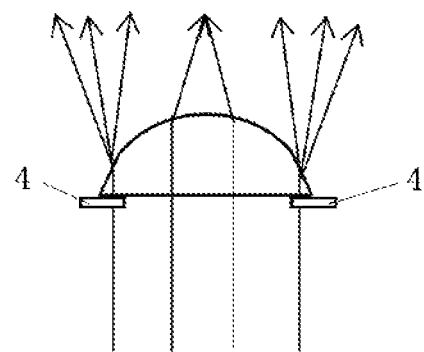
FIG. 6 is an optical path diagram of a naked eye 3D display formed by a liquid crystal lens unit according to one embodiment of the present disclosure.
Figure 7:
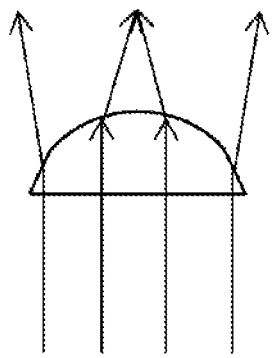
FIG. 7 is an optical path diagram of a naked eye 3D display thrilled by a conventional liquid crystal lens unit.

FIG. 6 shows an optical path diagram of a naked eye 3D display formed by a liquid crystal lens unit according to one embodiment of the present disclosure. By contrast, FIG. 7 shows an optical path diagram of a naked eye 3D display formed by a conventional liquid crystal lens unit, which does not employ one embodiment of the present disclosure. As can be seen from FIG. 6 and FIG. 7, the scattering member 4 in FIG. 6 can scatter crosstalk light.

Figure 8:
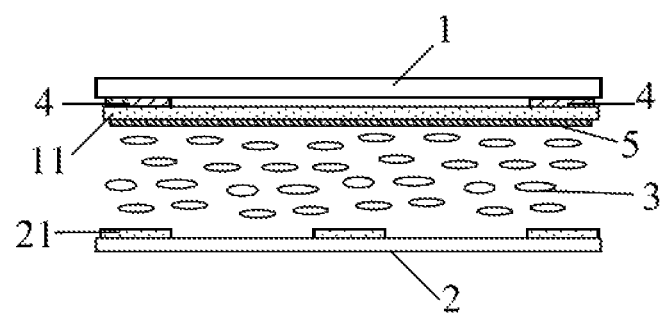
FIG. 8 is a schematic view of a liquid crystal lens unit according to one embodiment of the present disclosure.

FIG. 8 shows another schematic view of a liquid crystal lens unit according to one embodiment of the present disclosure. In this embodiment, an alignment film 5 is further provided on the first substrate 1. The alignment film 5 is closer to the second substrate 2 than the first electrode 11 and the scattering members 4. That is, in one embodiment, an alignment film 5 is provided below the first electrode 11 as shown in FIG. 8. The alignment film is used to regularly align liquid crystal molecules in the liquid crystal layer 3 in a certain direction.

In one embodiment, a plurality of stripe-shaped second electrodes 21 is provided on the second substrate 2. The scattering members 4 are provided at some positions opposite some of the strip-shaped second electrodes 21. In another embodiment, a width of a scattering member 4 is substantially the same as a width of a stripe-shaped second electrode. Furthermore, a center of the scattering member 4 substantially corresponds to a center of the strip-shaped second electrode.

In another embodiment, a liquid crystal lens unit includes n stripe-shaped second electrodes 21. Two scattering members 4 are provided on the first substrate at positions opposite the first and the n-th stripe-shaped second electrodes 21, respectively.

Figure 9:
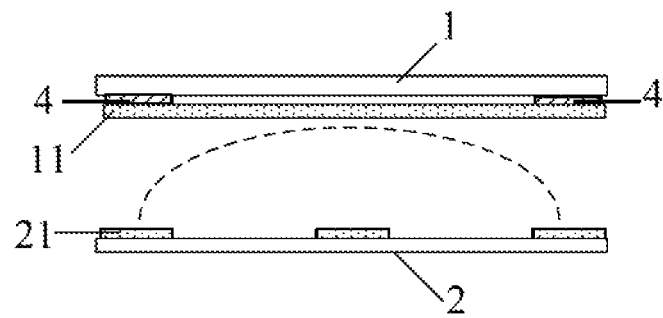
FIG. 9 is a schematic view of a liquid crystal lens unit according to one embodiment of the present disclosure.

FIG. 9 shows a schematic view of a liquid crystal lens unit according to one embodiment of the present disclosure. As shown in FIG. 9, when an electric field is applied to the first electrode 11 and the stripe-shaped second electrode 21, a liquid crystal lens unit is formed over the three stripe-shaped second electrodes 21. Therefore, scattering members 4 are provided at the edges of the liquid crystal lens unit opposite the stripe-shaped second electrodes 21. That is, the scattering, members 4 are provided at the positions opposite the first and the third stripe-shaped second electrodes 21, as shown in FIG. 9.

Figure 10:
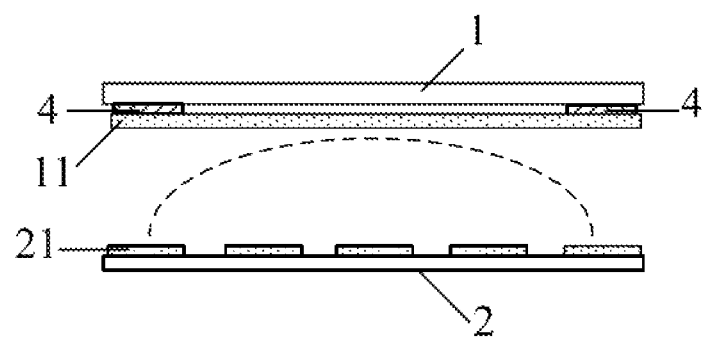
FIG. 10 is a schematic view of a liquid crystal lens unit according, to one embodiment of the present disclosure.

FIG. 10 shows a schematic view of a liquid crystal lens unit according to one embodiment of the present disclosure. As shown in FIG. 10, when an electric field is applied to the first electrode 11 and the stripe-shaped second electrode 21, a liquid crystal lens unit is formed over the five stripe-shaped second electrodes 21. Therefore, scattering members 4 are provided at the edges of the liquid crystal lens unit opposite the stripe-shaped second electrode 21. That is, the scattering members 4 are provided at the positions opposite the first and the fifth stripe-shaped second electrodes 21, as shown in FIG. 10.

In one embodiment, taking the three stripe-shaped second electrodes of FIG. 9 as an example, the first stripe-shaped second electrode 21 is at a high voltage signal. The second stripe-shaped second electrode 21 is at a low voltage signal. The third stripe-shaped second electrode 2, that is, the first of the next cycle, is also at a high-voltage signal. In one embodiment, the low voltage signal is 0.1V and the high voltage signal is 10V. The specific signal and the number of second electrodes may be determined based on period and focal length of the lens.

In one embodiment, the scattering member 4 includes scattering particles having particle sizes in a range of 10 nm to 100 µm, preferably in a range of 100 nm to 10 µm, more preferably in a range of 1 µm to 5 µm. In one embodiment, the scattering particles may have spherical shape and have diameters in a range of 10 nm to 100 µm, preferably in a range of 100 nm to 10 µm, more preferably in a range of 1 µm to 5 µm. When light is reflected after entering surfaces of the scattering particles, due to random arrangements of the scattered particles, directions of the reflected light are not fixed. As a result, crosstalk light that enters human eyes is significantly weakened. Furthermore, because of random distribution of the scattered light, conditions for light interference are not met. As a result, moiré pattern is not significantly increased. In one embodiment, the scattering particles may be resin balls, silicon balls or balls of similar materials which have light transmission characteristics and can change direction of transmitting light.

In one embodiment, the scattering member 4 is formed on the first substrate 1 by adhesion. Specifically, optical adhesive or other adhesive materials can be used. An area of an adhesive material with a certain shape is first etched on the first substrate 1 at edges of the liquid crystal lens unit. Then, the scattering particles are sprayed on the first substrate. After that, cleaning is performed. As such, scattering particles in the area of the adhesive material remain. Scattering particles in the area having no adhesive material are washed away.

In another embodiment, the scattering member 4 is formed on the first substrate 1 by adsorption. The method of adsorption includes electrostatic adsorption. The electrostatic adsorption may include the following steps: an electrical signal is applied between the first electrode 11 and the second electrode 21 to generate an electric field. Then, the scattering member 4 is formed on the first substrate 1 by electrostatic adsorption. Specifically, since the scattering member 4 is located just above the stripe-shaped second electrode, electrical signal can be applied on the stripe-shaped second electrode 21 on the second substrate 2 to generate an electric field. As a result, the scattering, material is adsorbed onto the first electrode 11 above the second electrode 21 by electrostatic adsorption. After covering with a material of an alignment film 5, subsequent processes can be performed.

Example 3

Figure 11:
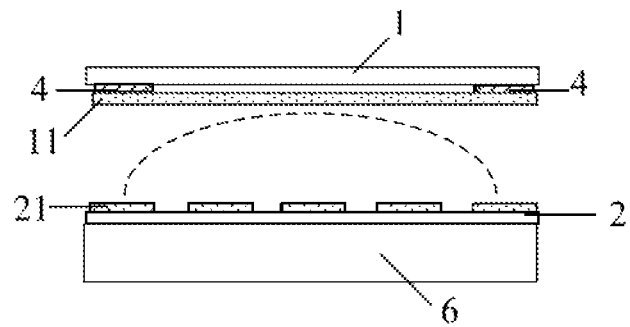
FIG. 11 is a schematic view of a naked eye 3D display panel according to one embodiment of the present disclosure.

FIG. 11 shows a schematic view of a naked eye 3D display panel according to one embodiment of the present disclosure. The naked eye 3D display panel, as shown in FIG. 11, includes a 2D display panel 6 and a liquid crystal lens unit according to one embodiment of the present disclosure. A second substrate 2 of the liquid crystal lens unit is adhered to a light exiting surface of the 2D display panel 6.

A number of variations may also be made in the above-described embodiments. For example, sizes of scattering members can be adjusted according to actual needs. Specific materials of scattering members can be selected based on actual products. In addition, thin film transistors or the like can be provided on the second substrate. The first electrode and the second electrode may be provided on the same substrate.

Example 4

The present embodiment provides a display device which includes any of the above-mentioned naked eye 3D display panels according to one embodiment of the present disclosure. The display device may be any product or component having a display function such as a liquid crystal display panel, an electronic paper, a mobile phone, a tablet computer, a television set, a monitor, a notebook computer, a digital photo frame device, a navigator, or the like.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

DESCRIPTION OF SYMBOLS IN THE DRAWINGS

1: first substrate
11: first electrode
2: second substrate
21: second electrode
3: liquid crystal layer
4: scattering member
5: alignment film
6: 2D display panel
71: liquid crystal lens unit
72: edge of the liquid crystal lens unit

What is claimed is:

1. A liquid crystal lens comprising a plurality of liquid crystal lens units, at least one of the plurality of liquid crystal lens units comprising:
   a first substrate,
   a second substrate opposite the first substrate;
   a liquid crystal layer between the first substrate and the second substrate; and
   a scattering member on the first substrate at an edge of the at least one of the plurality of liquid crystal lens units,
   wherein the scattering member is configured to scatter crosstalk light at the edge of the at least one of the plurality of liquid crystal lens units.

2. The liquid crystal lens according to claim 1, wherein the at least one of the plurality of liquid crystal lens units further comprises a first electrode on the first substrate.

3. The liquid crystal lens according to claim 2, wherein the scattering member is between the first substrate and the first electrode.

4. The liquid crystal lens according to claim 2, wherein the scattering member is on a surface of the first electrode facing the second substrate.

5. The liquid crystal lens according to claim 1, wherein the at least one of the plurality of liquid crystal lens units further comprises an alignment film on the first substrate,
   wherein the alignment film is on a surface of the first electrode facing the liquid crystal layer.

6. The liquid crystal lens according to claim 1, wherein the at least one of the plurality of liquid crystal lens units further comprises a plurality of stripe-shaped second electrodes on the second substrate,
   wherein the scattering member is at a position corresponding to one of the stripe-shaped second electrodes.

7. The liquid crystal lens according to claim 6, the plurality of stripe-shaped second electrodes comprises n adjacent stripe-shaped second electrodes on the second substrate,
   wherein the scattering member is provided on the first substrate at a position corresponding to the first electrode and n-th stripe-shaped second electrode respectively, and n is a positive integer of greater than or equal to 2.

8. The liquid crystal lens according to claim 7, wherein a center of the scattering member corresponds to a center of one of the stripe-shaped second electrodes.

9. The liquid crystal lens according to claim 1, wherein the scattering member is adhered to the first substrate by an adhesive.

10. The liquid crystal lens according to claim 1, wherein the scattering member is adsorbed onto the first substrate.

11. The liquid crystal lens unit according to claim 1, wherein the scattering member is a scattering structure integrally on a surface of the first substrate.

12. The liquid crystal lens according to claim 1, wherein the scattering member comprises scattering particles having particle sizes in a range of 10 nm to 100 μm.

13. The liquid crystal lens according to claim 12, wherein the scattering particles are made of resin or silicon.

14. The liquid crystal lens according to claim 13, wherein the scattering particles are spherical shape.

15. A method of manufacturing a liquid crystal lens comprising:
   forming scattering members on a first substrate at edges of liquid crystal lens units; and
   forming a liquid crystal cell by cell assembling the first substrate and a second substrate.

16. The method of manufacturing a liquid crystal lens according to claim 15, wherein the scattering members are formed on the first substrate by an adhesion method.

17. The method of manufacturing a liquid crystal lens according to claim 15, wherein the scattering members are formed on the first substrate by an adsorption method.

18. The method of manufacturing a liquid crystal lens according to claim 17, wherein the adsorption method includes electrostatic adsorption, comprising the following steps:
   applying an electrical signal on one of stripe-shaped second electrodes; and
   forming the scattering members on the first substrate by electrostatic absorption.

19. A naked eye 3D display panel comprising:
   a 2D display panel; and
   a liquid crystal lens according to claim 1;
   wherein the liquid crystal lens is on a light exiting side of the 2D display panel, and scattering members are at edges of adjacent liquid crystal lens units.

20. A display device comprising the naked eye 3D display panel according to claim 19.

* * * * *